March 21, 1939.   A. J. WARWICK   2,151,250
SPRAG DEVICE FOR VEHICLES
Filed July 7, 1937

INVENTOR
Arthur Jack Warwick
BY
Darby & Darby
ATTORNEYS

Patented Mar. 21, 1939

2,151,250

UNITED STATES PATENT OFFICE 2,151,250

SPRAG DEVICE FOR VEHICLES

Arthur Jack Warwick, London, England, assignor to Stancliffe Free-Wheeling Limited, London, England Application July 7, 1937, Serial No. 152,322
In Great Britain July 15, 1936

2 Claims. (Cl. 192—4)

This invention relates to spragging devices for motor vehicles.

There have been various proposals relating to devices for preventing a motor vehicle from moving backwards. Among others are suggestions for rendering the device inoperative when the vehicle transmission is set for reverse and leaving it inoperative thereafter until the vehicle has actually started to move forward. In such arrangements it has also been suggested to provide a special device for rendering the sprag inoperative without entering reverse, so that the vehicle can be maneuvered backwards and forwards when in a garage or at other times without the use of the engine. In such cases it is necessary to ensure that the sprag again becomes operative automatically without the necessity for the garage hand or whoever has set the special device remembering to unset it again or relying upon a return spring. It has been suggested that this might be accomplished when the transmission is set for any forward speed and the vehicle starts to move. This is not, however, a very simple mechanical arrangement as it necessitates operation of the device by any one of several possible alternative movements and it is an object of the present invention to provide a more simple and equally efficient arrangement.

It is also an object of the invention to provide an arrangement, in which the sprag is rendered incapable of operation by a special device and is immediately restored to its operative state by the performance of a single essential operation which the driver has to perform before the car can be moved off under power. It is preferred that the operative condition of the sprag should be automatically restored by the depression of the clutch pedal (or its equivalent in vehicles with preselection transmission systems which do not involve the normal clutch pedal); it might possibly be done, however, by some other essential movement (such for example as depression of the accelerator or the act of switching on the engine) according to the particular arrangement or mechanism of the vehicle.

With the above and other objects in view, the invention consists in the improved combinations and arrangements contained in the embodiments now to be described in detail, novel features of which are set out in the claims which follow. In the drawing:

Figure 1:
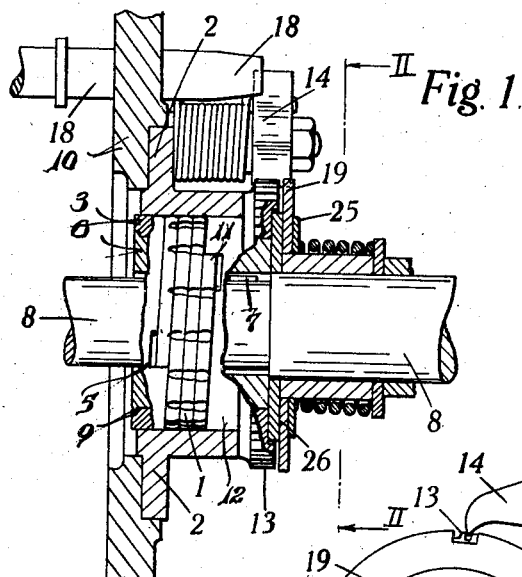
Fig. 1 represents a longitudinal section through a sprag device.

In the drawing, the invention is illustrated as applied to a sprag as described in the specification of my co-pending application No. 152,323, filed July 7, 1937, that is to say a sprag comprising a coil spring 1 arranged within a brake housing 2 and has one end anchored to a scroll 3 by means of a portion 4 which is received within a recess 5 in the scroll. The scroll 3 is keyed to a hub 6 which is splined, as at 7, to the gear-box main output shaft 8 and has a flange 9 against which the scroll 3 abuts.

The brake housing 2 is fixed to the end wall 10 of the gear-box by bolts or the like (not shown).

The other end of the spring 1 is anchored by means of a portion 11, to a scroll 12; this second scroll is integral with an energizing ratchet 13, which is rotatably mounted on the hub 6.

The rotation of the shaft 8 is transmitted, through the scrolls 3 and 12 and spring 1, to the ratchet 13, so that these parts normally rotate together, there being slight clearance between the spring 1 and the inside of the housing 2.

Figure 2:
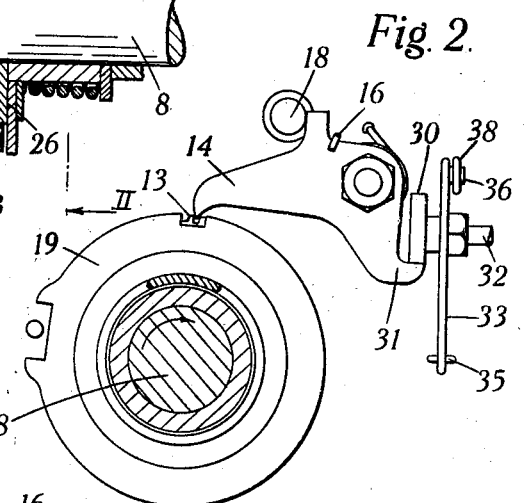
Fig. 2 is a view on the line II—II of Fig. 1 showing diagrammatically some parts not visible in that figure and omitting other parts.

A pawl or detent 14 is mounted for pivotal movement upon a spindle 15, carried by the gearbox wall 10, and is urged by a spring 16 toward engagement with the teeth of the ratchet 13. In Figure 2, the direction of reverse rotation of the shaft 8 is indicated by an arrow and it will be evident that, with the parts in the relation illustrated by that figure, forward rotation of the shaft (and ratchet) will result in the pawl clicking over the teeth of the ratchet, whilst rotation of the ratchet in the direction corresponding to reverse rotation of the shaft 8 will be prevented by the engagement of the pawl with the reverse-facing teeth of the ratchet. When this occurs, continued backward movement of the vehicle causes the spring 1 to be expanded into locking engagement with the housing 2 to sprag the vehicle.

Normal backward movement of the vehicle under power is provided for by arranging that the pawl is swung out of engagement with the ratchet by the action of the reverse gear shift-rod 18, as described in the co-pending specification. A control member 19, driven by friction discs 25 and 26, is provided to engage the pawl when the vehicle is moving in either direction, also as described in the co-pending application.

In order that the energizer may be rendered inoperative when it is desired to move the vehicle backwards without the use of reverse gear, for example to maneuver the vehicle by hand in the garage, a cam 30 is provided arranged to co-operate with a lug 31 on the pawl 14 to swing the latter out of engagement with the ratchet.

Figure 3:
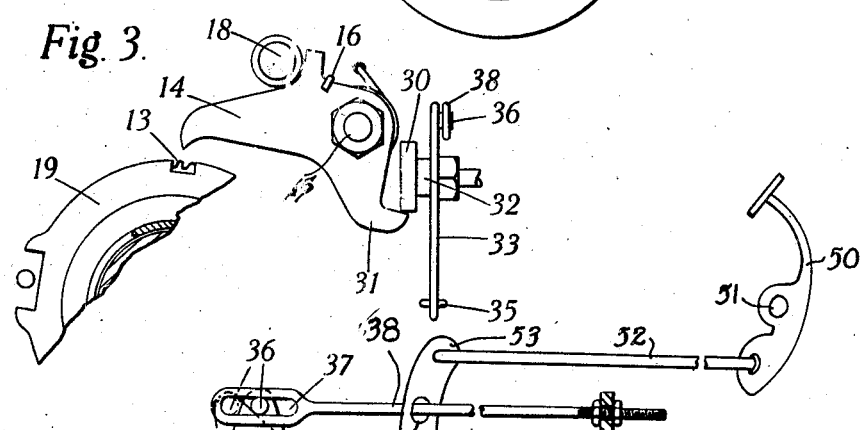
Fig. 3 is a similar view of a portion of the mechanism shown in Fig. 2 parts being in positions different from those occupied in Fig. 2, and, Fig. 4 is a diagrammatic showing of mechanism provided for the control of parts shown in Figures 2 and 3.

In Fig. 2, the cam is illustrated in its normal position in which it does not interfere with the action of the pawl: in Fig. 3, the cam is shown as having been rotated to rock the pawl out of engagement with the ratchet.

Figure 4:
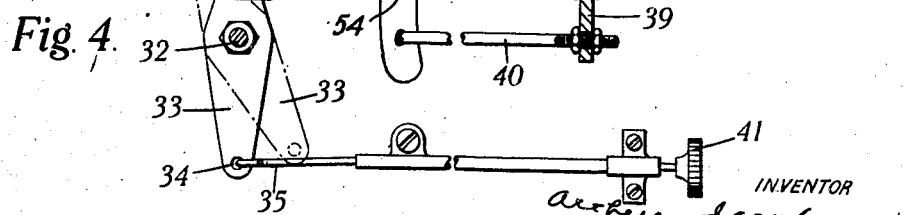

As can be seen from Fig. 4, the spindle 32 of the cam 30 has a squared portion, upon which a lever 33 is mounted. A hole 34 in the longer arm of this lever is engaged by the hooked end of a member 35 which forms part of a transmission mechanism; this mechanism is controlled through a knob or the like 41, which is arranged in an easily accessible position, for example on the dashboard of the vehicle, and by means of which the lever 33 may be caused to rock from the full line position in Fig. 4 to that shown in dotted lines, with the result that the cam and pawl assume the position shown in Fig. 3 and render the sprag inoperative.

The mechanism for controlling the cam may comprise some form of flexible transmission mechanism, which will preferably be of the "push-pull" type in order that the lever 33 may be caused to rock in both directions by appropriate actuation of the control knob.

It is not necessary, however, for the person who has rendered the sprag inoperative, by actuation of the control knob, to remember to render it operative again when he has finished maneuvering the vehicle, for automatic means are provided for ensuring that this is done before the vehicle can be used in the normal way. As shown in Fig. 4, a pin 36 carried by the shorter arm of the lever 33 engages in a slot 37 in a rod 38. The other end of the rod 38 is adjustably secured to a plate 39 by means of which it is coupled by the rod 40 to a lever 53. The lever 53 is pivotally mounted on a stud 54 and connected by rod 52 to the clutch pedal lever 50 pivotally mounted at 51. When the lever 33 is in the position shown in full lines in Fig. 4 and the clutch is engaged, the pin 36 occupies a position as shown in full lines in the drawing.

Actuation of the knob 41 to render the sprag inoperative results in the pin taking up the position shown in dotted lines. Should the pin occupy this position, when the clutch pedal is depressed, the end of the slot 37 will contact it and return the lever to the full line position, whereby the sprag normally becomes capable immediately of operation to check backward movement of the vehicle. The only circumstances in which the return of the lever to the full line position in Fig. 4 will not render the sprag capable of immediate operation to check backward movement are when the reverse gear is engaged at the time (this would not normally occur, of course) and when the last motion of the vehicle with the sprag inoperative has been backward movement, in which case the pawl will be held raised by the friction-operated control member 19 and forward movement of the vehicle will be necessary in order to render the sprag operable again.

Whilst control arrangements in accordance with the present invention have been described above in conjunction with a specific form of sprag device, it is clearly applicable also to other forms of such devices and it may be applied by numerous expedients other than those specifically described by way of example.

I claim:

1. A sprag device for vehicles comprising a coil spring clutch capable of being energized to prevent backward movement of the vehicle, a ratchet, a detent capable of cooperating with said ratchet to energize said coil spring clutch upon backward movement of the vehicle, means for maintaining said detent out of engagement with said ratchet, said means being rendered incapable of such maintenance by the performance of a single essential operation, which the driver has to perform before the vehicle can be moved off under power.

2. A sprag device for vehicles comprising a coil spring clutch capable of being energized to prevent backward movement of the vehicle, a ratchet connected to the spring of said coil spring clutch, a detent capable of engaging said ratchet to energize said coil spring clutch upon backward movement of the vehicle, a cam capable of engaging said detent and of being rocked to maintain said pawl out of engagement with said ratchet and means whereby said cam is returned to normal position, in which said detent is permitted to engage said ratchet, upon the performance of a single essential operation, which the driver has to perform before the vehicle can be moved off under power.

ARTHUR JACK WARWICK.